Nov. 19, 1963   R. KATES   3,111,337
SUPPORTING LEG STRUCTURE FOR BARBECUE BOWLS AND THE LIKE
Filed Sept. 25, 1961   3 Sheets-Sheet 1
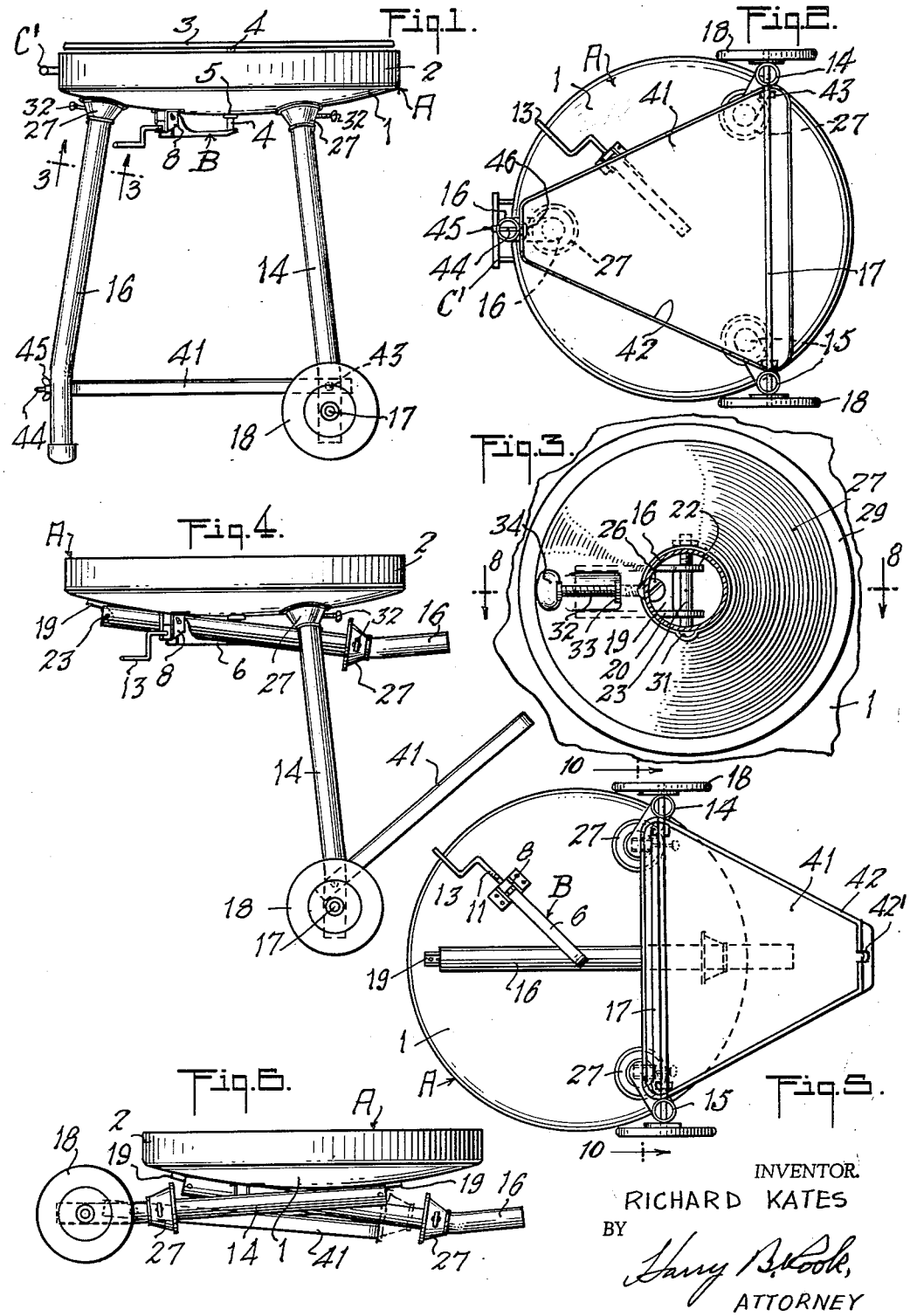
INVENTOR.
RICHARD KATES
BY
Harry B. Cook,
ATTORNEY Nov. 19, 1963   R. KATES   3,111,337
SUPPORTING LEG STRUCTURE FOR BARBECUE BOWLS AND THE LIKE
Filed Sept. 25, 1961   3 Sheets-Sheet 2
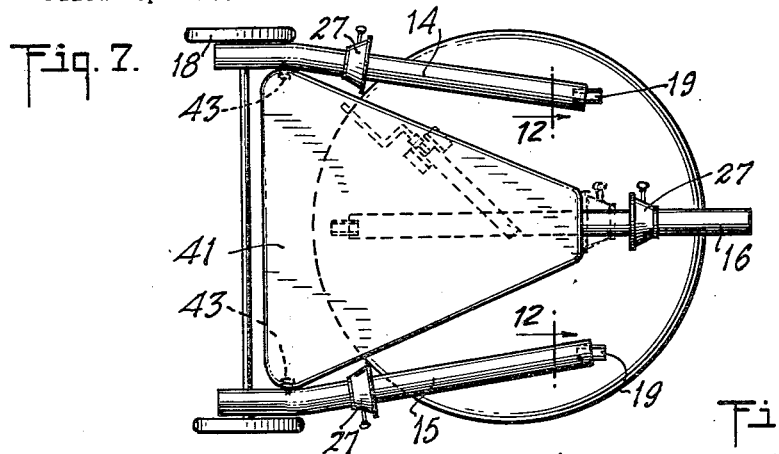
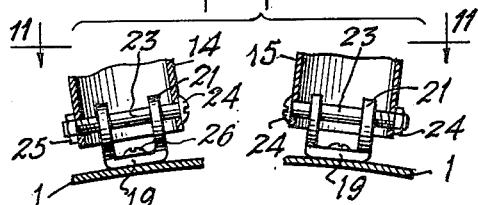
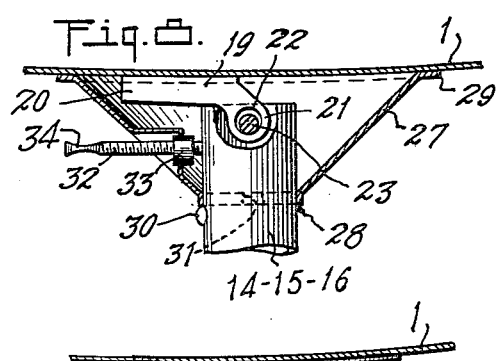
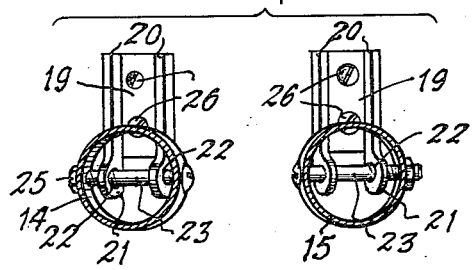
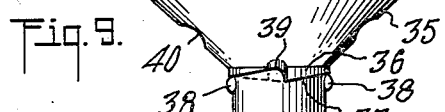
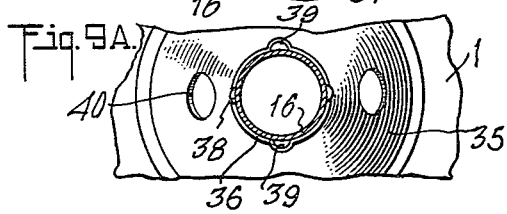
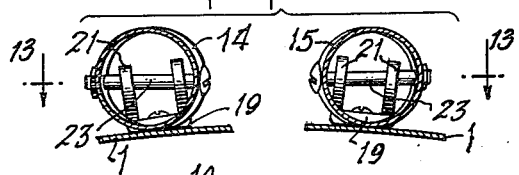
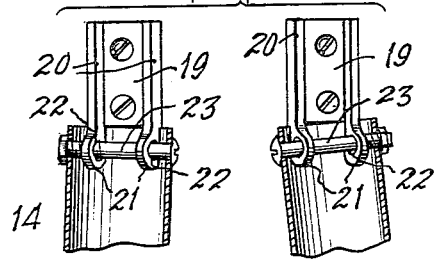
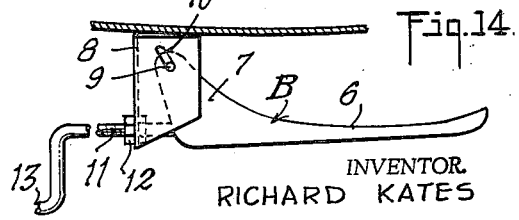
INVENTOR.
RICHARD KATES
BY
ATTORNEY Nov. 19, 1963     R. KATES     3,111,337
SUPPORTING LEG STRUCTURE FOR BARBECUE BOWLS AND THE LIKE
Filed Sept. 25, 1961     3 Sheets-Sheet 3
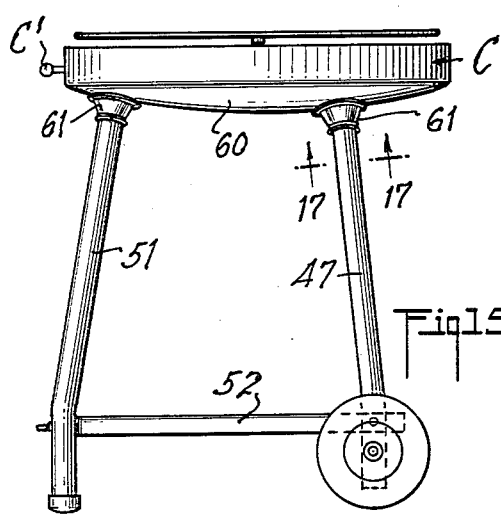
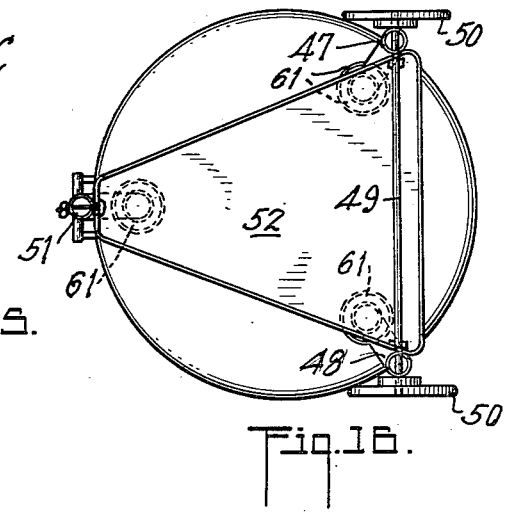
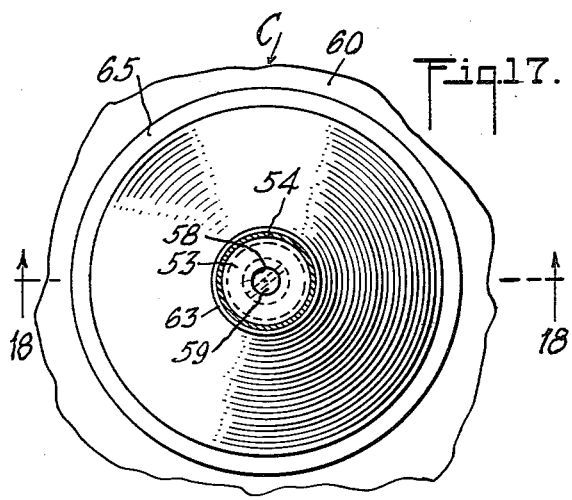
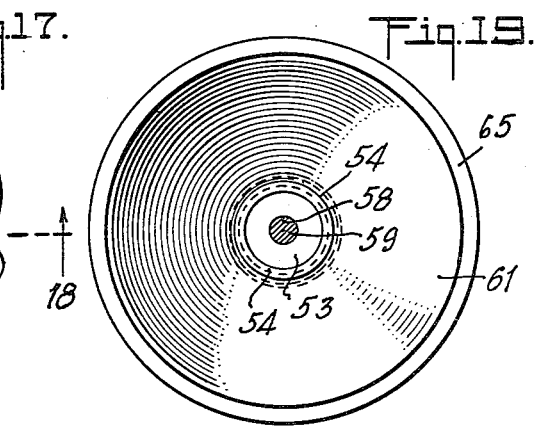
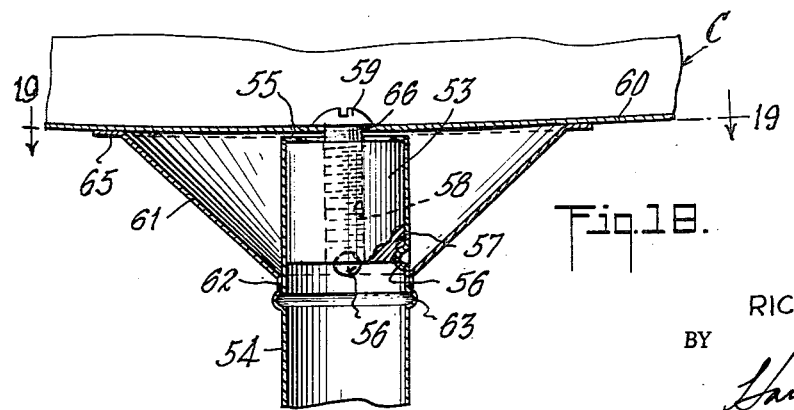
INVENTOR.
RICHARD KATES
BY
ATTORNEY United States Patent Office 3,111,337
Patented Nov. 19, 1963

3,111,337
SUPPORTING LEG STRUCTURE FOR BARBECUE BOWLS AND THE LIKE
Richard Kates, Park Lane, Madison, N.J.
Filed Sept. 25, 1961, Ser. No. 140,477
4 Claims. (Cl. 287—20)

This invention relates particularly to barbecue bowls having supporting legs, but the invention may be utilized in supporting legs for other structures.

The invention will be shown and described in connection with steel barbecue bowls having concavo-convex bottom walls, such bowls usually being supported on three legs. One of the objections to leg-supported barbecue bowls is that the legs are not sufficiently rigidly connected to the bowls and consequently the bowls wobble during use thereof. In some cases the legs are rigidly and removably connected to the bowls, but in many instances it is desirable that the legs be permanently but hingedly connected to the bowl so that the legs can be folded against the bowl for convenience in transportation of the bowl and leg construction as a unit which requires only a small amount of space for storage or transportation of the assembly.

One object of the present invention is to provide a novel and improved construction and combination of support legs with a structure such as a barbecue bowl, wherein the legs shall be firmly and rigidly associated with the bowl when in use.

Another object is to provide such a combination of a structure and a plurality of legs for supporting it, wherein the legs are connected to the structure such as a barbecue bowl in a novel and improved, simple and inexpensive manner which shall ensure the desired rigidity of the attachment of the legs to the structure.

Still another object is to provide a structure such as a barbecue bowl and a plurality of legs for supporting it which shall be pivotally connected to the structure or bowl in a novel and improved manner whereby the legs shall be rigidly associated with the bowl when in use but can be easily and quickly folded against or in compact relation to the bottom of the structure or bowl to allow for easy portability or transportation of the assembly and to permit the handling and storage of the assembly in a small amount of space.

Other objects, advantages and results of the invention will be brought out by the following description in conjunction with the accompanying drawings in which FIGURE 1 is a side elevation of a barbecue bowl and a foldable leg construction embodying the invention, showing the legs in operative or use position;

FIGURE 2 is a bottom plan view thereof;

FIGURE 3 is an enlarged horizontal sectional view approximately on the plane of the line 3—3 of FIGURE 1 with portions omitted;

FIGURE 4 is a view similar to FIGURE 1 showing one of the legs in folded position;

FIGURE 5 is a bottom plan view of the parts as shown in FIGURE 4;

FIGURE 6 is a side elevation of the bowl and leg construction assembly with all the legs folded against the bottom wall of the bowl;

FIGURE 7 is a bottom plan view of the parts as shown in FIGURE 6;

FIGURE 8 is a fragmentary vertical sectional view approximately on the plane of the line 8—8 of FIGURE 3;

FIGURE 9 is a view similar to FIGURE 8 showing a modification of the connection of the leg to the bowl;

FIGURE 9A is a bottom view of the parts shown in FIGURE 9 with portions broken away;

FIGURE 10 is an enlarged vertical sectional view approximately on the plane of the line 10—10 of FIGURE 5 with portions of the bottom of the bowl broken away, and with the connections of the legs illustrated nearer to each other than they are shown in FIGURE 5;

FIGURE 11 is a plan view of the parts shown in FIGURE 10 taken from approximately the plane of the line 11—11 of FIGURE 10;

FIGURE 12 is a fragmentary vertical sectional view similar to FIGURE 10 but taken on the plane of the line 12—12 of FIGURE 7;

FIGURE 13 is a horizontal sectional view approximately on the plane of the line 13—13 of FIGURE 12 with the hinge brackets shown in plan view;

FIGURE 14 is an enlarged fragmentary side elevation of the combined grill support and leg clamp;

FIGURE 15 is a view similar to FIGURE 1 showing a barbecue bowl having legs rigidly but removably attached thereto;

FIGURE 16 is a bottom plan view of the assembly shown in FIGURE 15;

FIGURE 17 is an enlarged horizontal sectional view on the plane of the line 17—17 of FIGURE 15 with portions omitted;

FIGURE 18 is a central vertical sectional view through the connection of one of the legs to the bottom wall of the bowl taken on the plane of the line 18—18 of FIGURE 17; and FIGURE 19 is a horizontal sectional view taken approximately on the plane of the line 19—19 of FIGURE 18.

Specifically describing the embodiment of the invention shown in FIGURES 1 to 14, reference character A designates a metal bowl of the generally known type having a circular concavo-convex bottom wall 1 having a circumferential upstanding side wall 2, providing a bed for charcoal or other fuel over which is removably arranged a food supporting grill 3 that generally has a central stud 4 slidably mounted in a bearing 5 in the bottom wall of the bowl with one end projecting below the bowl bottom and abutting an adjustable support B which is shown as an L-shaped lever with one arm 6 underlying the stud 4 and the other arm 7 pivotally connected to a U-shaped bracket 8 by a pivot pin 9 connected to and extending between the arms of the bracket and having one end movable in a slot 10 in the bracket arm to permit tilting of the lever for engagement with one of the legs when the latter is in folded position as hereinafter described. The lever 6, 7 is adjustable about its pivot by means of a screw 11 threaded in a nut 12 secured in the bracket 8, one end of the screw abutting the lever at a point between the arms 6 and 7 and the other end of the screw having a crank handle 13 for rotating the screw. By rotating the screw 11, the lever 6, 7 may be swung about its pivot to raise and lower the grill 3.

Associated with the bowl A is a foldable leg construction that is shown as comprising three legs 14, 15 and 16, each of which has one end hingedly connected to the bottom side of the bottom wall 1 of the bowl. As shown, the pivotal connections of the legs to the bowl are spaced apart circumferentially of the bowl at angles of about 120 degrees. One of the legs, in the present instance leg 16, is a prop leg, while the other legs 14 and 15 have mounted therein an axle rod 17 on the ends of which are journaled wheels 18 whereby the assembly can be rolled over the ground upon lifting and pulling or pushing the bowl by means of a handle C' or the prop leg. With this construction it will be seen that the two legs 14 and 15 may swing together and with the axle rod, while the prop leg 16 may swing by itself.

As shown in the drawings, the legs usually are disposed at an oblique angle to the plane of the bowl so that the lower ends of the legs are farther apart than the upper ends to increase the stability of the support of the bowl by the legs. The hinged connections of the legs to the bowl involves two problems, namely, compensation for said oblique relation of the legs to the bowl and compensation for the convex bottom surface of the bowl to which the legs are connected. For the purpose of solving both of these problems, the hinged connection for each leg, particularly the two hinged connections for the legs 14 and 15 that are connected together, comprises a hinge bracket 19 that is in the form of a plate having upturned parallel flanges 20 at two opposite edges which extend beyond one end of the plate and have hinge ears 21 formed with axially aligned openings 22 through which extend a hinge pintle 23 that is shown in the form of a bolt which also extends through openings in the end portion of the corresponding leg and has a head 24 at one end and a nut 25 at the other end. Of course, if desired, the pintle could have integral upset heads at each end instead of the head 24 and nut 25. The brackets are secured to the bottom surface of the bowl bottom wall 1 by suitable means such as screws 26, and as shown in FIGURES 10 to 13, inclusive, the brackets are disposed with their pivot ears in approximately radial relation to the convex bottom wall and the ears of one bracket at angles to the ears of the other bracket; and the openings 22 in the hinge ears are substantially larger in diameter than the hinge pintles as best shown in FIGURE 8. This construction permits the legs to swing or fold against the bottom wall of the bowl as best shown in FIGURES 6, 7 and 12, the hinge pintles being movable into substantial axial alignment with each other and into positions oblique to the axes of the openings 22 when viewed from a plane perpendicular to the general plane of the bowl as shown in FIGURE 12 and the axes of the pintles when viewed from a plane approximately parallel with the plane of the bowl being obliquely disposed with respect to each other as shown in FIGURE 13, so that the legs may lie close to the bottom wall of the bowl. This hinge construction is not as important in the connection with the prop leg because that leg may swing in a plane perpendicular to the plane of the bowl, although the enlarged pintle openings 22 do permit the leg to lie more nearly parallel to the plane of the bowl than would be possible if the openings were of the same diameter as the pintles. It will be understood that the axes of the openings 22 for the hinge pintles are spaced from the bottom surface of the bowl a sufficient distance to permit the legs which are shown as tubular and circular in cross-section to have a free movement into folded position without interference of the legs with the bottom wall of the bowl as best shown in FIGURES 6 and 12.

When the legs are swung into their normal or use position as shown in FIGURE 1, the edges of the hinged ends of the legs abut the edges of the flanges 20 of the hinge brackets as shown in FIGURES 8 and 10 and 11 to limit the swinging of the legs in one direction and provide a firm stop or abutment for the end of each leg.

The invention also contemplates novel means for rigidifying said hinged connections when the legs are in use positions as shown in FIGURE 1. Such means is illustrated as comprising a clamp including a frusto-conical sheet metal brace member 27 having a flanged opening 28 in its smaller end telescopically slidable on the corresponding leg and having a circumferential flange 29 at its larger end to abut the bottom surface of the bottom wall 1 of the bowl as best shown in FIGURE 8. The leg has a projection 30 thereon against which the flange 28 of the brace member abuts when the leg is in its use position as shown in FIGURE 8; and the brace member has a groove 31 in its flange 28 providing a clearance for the projection 30 for permitting the brace member to be slid into use position as shown in FIGURE 8 and out of use position as shown in FIGURES 4, 6 and 7. The brace member 27 also has a set screw 32 screw threaded in a nut 33 rigidly secured to the brace member so that one end of the screw may abut the end portion of the leg at the same side of the leg as the projection 30 and the screw may be tightened by rotating the screw with the aid of a fingerpiece 34 and cause relative tilting of the brace member and the leg until the flange 9 of the brace member tightly abuts the bowl bottom wall, the smaller edge of the brace member tightly abuts the projection 30 and the hinge pintle 23 tightly enagages one side edge of the pintle openings 22 as shown in FIGURE 8. With this construction, the leg is rigidly connected to the bowl so that the tendency of the bowl to wobble on the legs is prevented or reduced to the minimum. Any looseness that may occur, may be taken up by tightening the screw 32.

A modification of the clamp for the leg is shown in FIGURES 9 and 9A where the frusto-conical brace member 35 has a flange 36 at its smaller end coaxial with the frusto-conical body and formed with an helical edge 37 to abut two projections 38 on the leg. The flange and body of the brace member have two diametrically opposite grooves 39 to permit the brace member to be slid past the projections 38 when desired. It will be understood that in order to rigidify the hinged connection of the leg to the bowl, the brace member 35 will be slid along the leg with the grooves 39 clearing the respective projections 38 until the brace member is disposed between the bowl bottom and the projections 38, whereupon rotation of the brace member will cause coaction of the helical edge 37 with the projections 38 tending to force the brace member into tight contact with the bowl bottom and to push the leg longitudinally away from the bowl bottom and thus cause tight engagement of the hinge pintle with the walls of the pintle openings. Preferably some such means as apertures 40 in the brace member will be provided for a firm hand grip on the brace member for rotating it.

Preferably a combined tray and leg strut 41, formed of a die-pressed sheet of metal of generally triangular shape with a marginal flange 42, is pivotally connected at two of its apexes as indicated at 43 to the legs 14 and 15 and is separably connected at its other apex to the prop leg 16. As shown, the flange 42 has a notch 42' in its edge that is slipped over a shank of a bolt 44 in the prop leg which has a wing nut 45 at its outer end and a head 46 at its other end so that by tightening the nut 45, the flange can be clamped between the head and the leg when the bowl and leg assembly are in use position as shown for example in FIGURES 1 and 2. In this position, the tray-strut 41 serves to reinforce and hold the bottom ends of the legs against tendencies to swing incident to movement of the assembly over the ground or to pressure on the top of the bowl.

When it is desired to collapse or fold the assembly, the tray-strut is disconnected from the prop leg 16 by loosening the nut 45, and the tray-strut is swung outwardly between the legs 14 and 15 as shown in FIGURE 4, whereupon the brace member 27 of the prop leg is loosened and slid down the leg, after which the leg is swung against the bottom of the bowl as shown in FIGURE 4. The leg can be held in this position by loosening and tilting the lever 6, 7 of the grill support B, the screw 11 and slot 10 in the bracket 8 permitting such tilting, and the lever is swung over the folded leg 16 to hold it in folded position as best shown in FIGURES 4 and 5. Thereupon the brace members 27 of the two legs 14 and 15 are loosened and slid down the legs, whereupon the two legs are folded at the same time and with the tray against the bottom of the bowl as shown in FIGURES 6 and 7. Suitable means may be provided for holding the legs in this position, but conveniently the brace member 27 of the prop leg may be slid along the prop leg and into engagement with the edge of the tray-strut as shown in FIGURES 6 and 7, whereupon tightening of the screw 32 will hold the brace member against movement on the leg and in firm holding contact with the tray.

As hereinbefore indicated, the invention also contemplates a novel and improved rigid connection of non-foldable but removable legs; and FIGURES 15 through 19 illustrate such structure. Here the bowl C may be identical with the bowl A, the legs may be identical with the legs shown in FIGURES 1 through 7, inclusive, except for the hinged connections and clamps. As shown, two of the legs 47 and 48 have mounted therein and are connected to an axle rod 49 at the outer ends of which are wheels 50, and the other leg 51 corresponds to the prop leg 16. Preferably the legs are reinforced by a tray-strut 52 that is identical with the tray-strut 41 and connected to the several legs in the same manner as the tray-strut 41.

In this construction, the end of each leg that is to be connected to the bowl has a nut 53 permanently secured therein against rotation relative thereto. For example, and as shown, the upper edge of the end portion of the tube 54 of which the leg is formed may be turned inwardly over the end of the nut to provide a flange 55 and protuberances 56 may be formed on the inner side of the tube wall to be abutted by the inner end of the nut so that the nut is held against longitudinal movement between the flange 55 and the protuberances 56. Rotation of the nut may be prevented in any suitable manner, for example, by forming notches 57 in the nut to seat over the protuberances 56. The nut has a longitudinal screw-threaded opening 58 therethrough that is coaxial with the leg tube 54 and a cap screw 59 has its shank screw threaded into said opening 58 and its head to abut the inner side of the bottom wall 60 of the bowl. A frusto-conical brace member 61 has a circumferential flange 62 at its smaller end to abut a circumferential bead or projection 63 on the leg tube 54, and has a circumferential flange 65 at its larger end to abut the bottom wall 60 of the bowl.

In assembling this construction, the brace member 61 is fitted over the end of the leg tube with its flange 62 in contact with the projection 63. The leg is manipulated to bring the screw-threaded opening 58 into register with an opening 66 in the bottom wall of the bowl, whereupon the screw 59 is slipped through the hole and is screwed into the opening 58. The height of the frusto-conical brace member 61 is greater than the distance between the projection 63 and the end of the leg tube as best shown in FIGURE 18 so that upon tightening of the screw 59, the leg is drawn toward the bottom wall of the bowl and the projection 63; and generally the relatively thin metal bottom wall of the bowl is resiliently flexed so as to maintain a strong yielding force which provides a rigid attachment of the leg to the bowl and at the same time resists unintentional loosening of the screw 59.

It will be understood by those skilled in the art that the now preferred embodiments of the invention have been illustrated and described primarily for the purpose of illustrating the principles of the invention and that modifications and changes may be made in the structural details and the leg construction can be adapted to other structures than the barbecue bowls within the spirit and scope of the invention.

I claim:

1. The combination of a structure having a bottom wall and at least one leg therefor, means connecting one end of said leg to the underside of said bottom wall, a brace element having a coaxial opening through which extends said leg for providing for sliding of said brace element longitudinally of said leg with one end of the brace element disposed to abut underside of said bottom wall, abutment means on and projecting from said leg for abutment by the other end of said brace element for holding the brace element against movement in the direction away from said wall, and means including the first-mentioned means for drawing said leg longitudinally toward said bottom wall to force the first-mentioned end of the brace element into tight abutment with said bottom wall and simultaneously force the second-mentioned end of the brace element into tight abutment with the abutment means on the leg thereby to provide a rigid association of the leg with the structure, said brace element being frusto-conical and formed of sheet metal with the larger end of the brace element abutting said bottom wall and the smaller end of said element abutting said abutment means on the leg.

2. The combination as defined in claim 1 wherein said leg is tubular and has a nut with a screw-threaded opening fixedly secured to said end of the leg, and said means for producing relative movement of said leg, said brace element and said bottom wall includes said nut and a headed screw passing through an opening in the said bottom wall and screwed into said screw-threaded opening.

3. The combination as defined in claim 1 wherein said means for producing relative movement of said leg, said brace element and said bottom wall includes a flange on the smaller end of said brace element having an helical edge coacting with said abutment means on the leg upon relative rotation of the brace element and the leg.

4. The combination as defined in claim 1 and wherein said means for producing relative movement of said leg, said brace element and said bottom wall includes a screw threaded in said brace element between its ends to abut said leg for tilting the brace element on the leg.

References Cited in the file of this patent

UNITED STATES PATENTS

| | | |
|---|---|---|
| D. 170,943 | Reinecke | Nov. 24, 1953 |
| 2,710,761 | Lagervall | June 14, 1955 |
| 2,730,419 | Watrous | Jan. 10, 1956 |
| 2,809,876 | Huff | Oct. 15, 1957 |
| 2,901,301 | Johnson | Aug. 25, 1959 |
| 3,028,184 | Knowlton | Apr. 3, 1962 |
| 3,062,128 | Louthan | Nov. 6, 1962 |